United States Patent
Wu et al.

(10) Patent No.: US 7,666,377 B2
(45) Date of Patent: Feb. 23, 2010

(54) METHOD FOR THE REMOVAL OF CARBON MONOXIDE FROM A GAS MIXTURE

(75) Inventors: Kuo-Ching Wu, Hsinchu (TW); Ching-Tang Lin, Hsinchu (TW); Chu-Chang Dai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 602 days.

(21) Appl. No.: 11/138,480

(22) Filed: May 27, 2005

(65) Prior Publication Data
US 2006/0099125 A1    May 11, 2006

(30) Foreign Application Priority Data
Nov. 9, 2004    (TW) ............................... 93134159 A

(51) Int. Cl.
*C10K 3/04* (2006.01)
*C01B 3/12* (2006.01)
(52) U.S. Cl. .................. 423/247; 423/655; 423/656
(58) Field of Classification Search .............. 423/246, 423/247, 655
See application file for complete search history.

(56) References Cited

U.S. PATENT DOCUMENTS 5,145,822 A * 9/1992 Falke et al. ............... 502/150
6,589,493 B2 * 7/2003 Hosaka et al. ............ 423/230

FOREIGN PATENT DOCUMENTS

CN    1579621    * 2/2005

* cited by examiner

*Primary Examiner*—Wayne Langel
*Assistant Examiner*—James Fiorito
(74) *Attorney, Agent, or Firm*—Bacon & Thomas, PLLC

(57) ABSTRACT

The present invention discloses a method for removing carbon monoxide (CO) from a gas mixture containing CO including contacting the gas mixture with a nano-gold catalyst to reduce the CO content in the gas mixture by CO selective adsorption/oxidation, water gas shift reaction or CO selective oxidation reaction. The nano-gold catalyst includes a solid support and gold deposited on the support, wherein the deposited gold has a size less than 10 nm, and the support is a mixed metal hydroxide and oxide having the following formula:

$M(OH)_qO_y$

Wherein M is Ti, Fe, Co, Zr, or Ni; q is 0.1-1.5; and q+2y=z, wherein z is the valence of M.

20 Claims, No Drawings

METHOD FOR THE REMOVAL OF CARBON MONOXIDE FROM A GAS MIXTURE

FIELD OF THE INVENTION

The present invention relates to a method for removing carbon monoxide (CO) from a gas mixture containing CO, particularly a method for removing carbon monoxide (CO) from a gas mixture containing CO by contacting the gas mixture with a nano-gold catalyst to reduce the CO content in the gas mixture through CO selective adsorption/oxidation, water-gas shift reaction and/or CO selective oxidation reaction.

BACKGROUND OF THE INVENTION

Gold is a highly stable metal without any catalyst activity. When the size of a gold particle is smaller than 10 nm, gold exhibits a unique room temperature activity due to meta-stable inter-atomic bonding of gold atoms. A nano-gold catalyst has the following three features: fast reaction rate, high selectivity, and low reaction temperature.

The oxidation reaction of carbon monoxide at room temperature is a best showcase reaction for a nano-gold catalyst. At present, only a nano-gold catalyst has the capability of oxidizing carbon monoxide at room temperature. The prerequisite for an active gold catalyst is the particle size of gold needs to be less than 10 nm, with an optimum catalyst particle size of <5 nm. Another factor affecting the activity of a gold catalyst is a strong metal-support interaction (SMSI) between gold and a support. The support is preferably selected from p-type and n-type semiconductor metal oxides. Available supports include: $TiO_2$, $Fe_2O_3$, $Co_3O_4$ and NiO, etc.

US 2004-0127353 A1, which issued as U.S. Pat. No. 6,911,413 on Jun. 28, 2005 discloses a nano-gold catalyst including a solid support and gold deposited on the support, wherein the deposited gold has a size less than 10 nm, and the support is a mixed metal hydroxide and oxide having the following formula:

$$M(OH)_qO_y$$

wherein M is Ti, Fe, Co, Zr, or Ni; q is 0.1-1.5; and q+2y=z, wherein z is the valence of M. The present invention also discloses a preparation process of the nano-gold catalyst. The nano-gold catalyst disclosed in this prior art at least is known to have an excellent CO oxidation activity and an excellent catalyst lifetime at room temperature. Moreover, said CO oxidation activity and catalyst lifetime are substantially not affected by the presence of moisture and a high concentration of $CO_2$.

An experiment on adsorption of carbon monoxide (CO) on the surface of metal is often used to analysis the dispersion of a metal on a support. Taking the surface of gold as an example, CO can be chemically adsorbed on the surface of gold. For example, the paper published by Gottfried J. M. etc. in 2003 [Surface Science (2003) Vol. 536 page 206-224] has shown that the adsorption of CO on the surface of gold is a very weak chemical adsorption. The amount of CO adsorption on the surface of gold is smaller than 50% of the atoms on the surface.

Haruta M. etc. [Catalysis Today (1997) Vol. 36 page 115~123] have studied the adsorption phenomena of carbon monoxide (CO) by 3.3 wt % $Au/TiO_2$. The study indicates that the maximum adsorption of CO per gram is lower than 4 ml (STP) within the adsorption temperature range of 253~303K, and the adsorption decreases along with an increase in the adsorption temperature. At 273K, the amount of CO adsorption is 2.5 ml (STP)/g-cat. and only 10% of the CO adsorbed will react with the oxygen pre-adsorbed to form carbon dioxide, while the remaining CO adsorbed (more than 90%) is reversible adsorption. This adsorption capacity is twice the adsorption capacity of gold atoms on surface (gold atoms on surface constitutes 40% of the total content). Stoichiometrically, the amount of adsorption is still less than 1 according to the total content of gold.

Behm R. J. etc. [J. Catalysis (2001) Vol. 197, page 113~122] have studied the adsorption phenomena of carbon monoxide (CO) by $Au/Fe_2O_3$. Their study indicates that 100 mg of $Fe_2O_3$ is capable of converting 0.51 µmol of carbon monoxide adsorbed into carbon dioxide at 80° C., and 100 mg of $Au/Fe_2O_3$ is capable of converting 0.76 µmol of carbon monoxide adsorbed into carbon dioxide at 80° C.

The abovementioned three articles all have indicated that the Au/support materials synthesized have poor adsorption power on carbon monoxide.

A polymer electrolyte fuel cell (PEFC) is highly possible to be applied as a stationary domestic power generation system or in an electric car, and a PEFC system requiring a fuel consisting of a hydrogen-rich gas (concentration of $H_2$>35%) with a CO concentration lower than 20 ppm. A hydrogen-rich reformate gas formed from a reforming reaction of hydrocarbon contains about 4~15% of CO, which needs to undergo a water-gas shift (WGS) reaction to reduce the CO content to less than 1%, followed by a preferential oxidation reaction or a methanation reaction and a preferential oxidation reaction (PrOX) in serial in order to reduce the CO concentration to be less than 100 ppm, or even less than 20 ppm.

WO 00/09259 (CA 246882A1) discloses a $Au/Fe_2O_3$ catalyst suitable for CO selective oxidation in a reformate gas. Said catalyst is prepared by depositing a gold cluster with a diameter less than 4.5 nm on a granular $Fe_2O_3$ catalyst support. A method for preparing said catalyst comprises: (a) reacting a water soluble Fe(III) salt with an alkaline in an aqueous medium; (b) immersing a wet hydroxide gel thus obtained in an aqueous solution of a water soluble gold compound in order to deposit a complex gold cluster on the surface of the hydroxide gel; (c) removing water from the obtained reaction product suspension; and (d) calcining the resulting dry reaction product at 350-700° C. Although said prior art catalyst can selectively oxidize CO in a reformate gas, its CO oxidation activity at room temperature is still too low.

SUMMARY OF THE INVENTION

One primary objective of the present invention is to provide a method for removing carbon monoxide (CO) from a gas mixture containing carbon monoxide.

Another objective of the present invention is to provide a method for removing CO from a gas mixture containing CO but free of oxygen.

Still another objective of the present invention is to provide a method for removing CO from a gas mixture containing CO and moisture.

Still further another objective of the present invention is to provide a method for removing CO from a gas mixture containing CO and oxygen.

In order to achieve the abovementioned objectives, a method accomplished according to the present invention comprises contacting a CO-containing gas mixture with a nano-gold catalyst to remove CO from said gas mixture by CO selective adsorption/oxidation, water-gas shift reaction or CO selective oxidation reaction.

The nano-gold catalyst of the present invention has excellent CO adsorption power at room temperature and is capable of providing lattice oxygen in an oxygen-free environment in order to convert CO into $CO_2$, thereby acting on CO the effects of not only physical adsorption but also chemical conversion. Thus in an oxygen-free environment, the nano-gold catalyst of the present invention is capable of adsorbing CO to an extent which is ten times higher than the gold content of the nano-gold catalyst (adsorption molar ratio of CO/Au>10), which is far superior to the conventional Au/support catalysts. The nano-gold catalyst of the present invention, after performing the adsorption/conversion of CO in an oxygen-free environment, is capable of replenishing the oxygen content per se when it is placed in an oxygen-containing environment.

The nano-gold catalyst of the present invention is also applicable in catalyzing a hydrogen-rich reformate gas in a water-gas shift reaction and a CO selective oxidation reaction.

DETAILED DESCRIPTION OF THE INVENTION

The present invention provides a method for removing carbon monoxide (CO) from a gas mixture containing CO, which comprises contacting a CO-containing gas mixture with a nano-gold catalyst in order to remove CO from said gas mixture, wherein said nano-gold catalyst includes a solid support and gold deposited on said support, wherein said gold has a size of less than 10 nm, and support comprises a mixed metal hydroxide and oxide having the following formula:

$$M(OH)_qO_y$$

wherein M is Ti, Fe, Co, Zr, or Ni; q is 0.1-1.5; and q+2y=z, wherein z is the valence of M.

Preferably, said support is composed of said mixed metal hydroxide and oxide, and has a specific surface area of larger than 150 $m^2/g$, and said nano-gold catalyst contains 0.1 to 10 wt % of gold, based on the weight of said support.

Preferably, q is 0.5-1.5 and M is Ti, Fe (III) or Co, and more preferably M is Fe (III).

Preferably, said gold has a size smaller than 5 nm.

Preferably, said gas mixture is free of oxygen, and more preferably said contacting is carried out at room temperature.

Preferably, said gas mixture further contains oxygen, and said contacting is carried out at room temperature.

Preferably, said gas mixture is a hydrogen-rich gas mixture further containing steam and hydrogen, and said contacting is carried out at a temperature from room temperature to 300° C. More preferably, said hydrogen-rich gas mixture is a hydrogen-rich reformate gas formed by reforming a hydrocarbon or methanol. Most preferably, said hydrogen-rich gas mixture contains 30-80 mole % of hydrogen, and has a mole ratio of $H_2O$ to CO is 2-10.

Preferably, said gas mixture is a hydrogen-rich gas mixture further containing oxygen and hydrogen, and said contacting is carried out at 50~250° C. More preferably, said hydrogen-rich gas mixture contains 30-80 mole % of hydrogen, and has a mole ratio of oxygen to CO is 0.5~2.

A suitable method for preparing the nano-gold catalyst of the present invention includes, but not limited to, the method disclosed in USP 2004-0127353 A1, which is a patent application submitted by the inventors of the present invention and which issued as U.S. Pat. No. 6,911,413 on Jun. 28, 2005. The disclosure of US 2004-0127353 A1, which issued as U.S. Pat. No. 6,911,413 on Jun. 28, 2005 is incorporated herein by reference.

The present invention can be further understood through the following examples, which are for illustrative purpose only and not for limiting the scope of the present invention.

PREPARATION EXAMPLE 1

2454 g of $FeCl_3.6H_2O$ was added into a 60 L container and 38 L water was then added. The mixture was dissolved under agitation to obtain a solution A (about 40 L). 14500 g of 30% ammonia solution was prepared in another container (solution B). The solution A was introduced into a container at a rate of 20 L/hr, and at the same time the solution B was added into the container within two hours, while stirring at a high speed (>500 rpm). After completion of the dripping, the agitation was continued for one hour. The obtained mixture was filtered, and the filtration cake was washed with deionized water to remove the chlorine ions contained therein until the wash filtrate no longer formed a white precipitation when 0.1 N silver nitrate solution was used for titration (washed for about 10 times). Next, the filtration cake was dried at 110° C. to obtain 780 g of a chocolate-colored dry Fe hydroxide support. The Fe hydroxide support has a BET specific surface area of 341 $m^2/g$ by a nitrogen adsorption experiment, and an average pore size of 3.29 nm measured by the BJH method.

PREPARATION EXAMPLE 2

3.0 g of gold was dissolved in 67 ml of an aqueous solution containing 50 ml of 12 N HCl and 17 ml of 70% $HNO_3$. The solution was diluted with water to form 500 ml of an acid aqueous solution containing gold ions.

PREPARATION EXAMPLE 3

500 ml of the acid aqueous solution containing gold ions prepared in Preparation Example 2 was diluted to 2 L, which was then dripped into a dispersion formed by 100 g of the Fe hydroxide support prepared in Preparation Example 1 and 1000 ml of water. Meanwhile, 30% of ammonia solution was used to adjust the pH value of the mixture to 8-10. The mixture was mixed for one hour. The resulting mixture was filtered. The resulting filtration cake was washed with deionized water to remove the chlorine ions contained therein until the wash filtrate no longer formed a white precipitation when 0.1 N silver nitrate solution was used for titration. The washed filtration cake was then dried at 110° C. to form 1a gold catalyst semi-product having a support of Fe hydroxide (abbreviated as 3.0% Au/Fe hydroxide).

EXAMPLES 1~12

Gold catalysts were obtained by separately calcining 500 mg of the gold catalyst semi-product prepared in Preparation Example 3 at 150, 160, 170, 180, 190, 200, 225, 250, 275, 300, 350, and 400° C. for four hours. The CO adsorption performance of said gold catalysts to a CO-containing $N_2$ gas stream was measured by introducing a stream of $N_2$ gas containing 1000 ppm CO at a flow rate of 250 ml/min through a quartz tube having an inside diameter of 6 mm and packed with the gold catalyst. The gold catalyst bed was supported by glass fiber at two ends thereof in the quartz tube, two ends of which were equipped with a thermal couple to measure the inlet and outlet temperatures. The results are shown in Table 1.

TABLE 1

| Example | Calcining temp. (° C.) | CO conc. at outlet (ppm) at adsorption time (min) of | | | | | | |
|---|---|---|---|---|---|---|---|---|
| | | 0 | 10 | 20 | 30 | 40 | 50 | 60 |
| 1 | 150 | 0 | 0 | 0 | 56 | 264 | 414 | 525 |
| 2 | 160 | 0 | 0 | 0 | 5 | 142 | 345 | 470 |
| 3 | 170 | 0 | 0 | 0 | 0 | 6 | 48 | 150 |
| 4 | 180 | 0 | 0 | 0 | 0 | 0 | 0 | 82 |
| 5 | 190 | 0 | 0 | 0 | 0 | 0 | 2 | 178 |
| 6 | 200 | 0 | 0 | 0 | 0 | 0 | 102 | 323 |
| 7 | 225 | 0 | 0 | 0 | 0 | 12 | 309 | 520 |
| 8 | 250 | 0 | 0 | 0 | 0 | 0 | 55 | 360 |
| 9 | 275 | 0 | 0 | 0 | 26 | 176 | 370 | 550 |
| 10 | 300 | 0 | 0 | 37 | 142 | 262 | 405 | 624 |
| 11 | 350 | 0 | 0 | 61 | 456 | 705 | 800 | 865 |
| 12 | 400 | 0 | 730 | 875 | 935 | 970 | 1000 | 1000 |

$N_2$ gas mixture containing 1000 ppm CO, flow rate 250 ml/min, GHSV=30,000 $hr^{-1}$ Blank test: CO concentration at outlet reaches 1000 ppm at 1.8 minutes Adsorption temperature: room temperature (25° C.)

Temperature difference between the inlet and outlet during the adsorption test is less than 1° C.

The data in Table 1 indicate that the calcining temperature is preferably 150-350° C. A nano-gold catalyst prepared in this calcining temperature range has excellent CO adsorption performance.

EXAMPLE 13

500 mg of the material prepared in Preparation Example 1 was disposed in a quartz tube with an inside diameter of 6 mm with two ends thereof separately supported by fiberglass. Two thermocouples were inserted to measure the variations of temperature at the front and rear ends of the material. The gas used in the experiment was a $N_2$ gas mixture containing 1000 ppm of CO. The adsorption experiment was conducted with the gas mixture flowing at 250 ml/min for 300 minutes. The CO-containing $N_2$ gas mixture adsorption results of the material prepared in Preparation Example 1 (without impregnated with gold is shown in Table 2.

EXAMPLES 14~18

500 mg of the material prepared in Preparation Example 3 was separately calcined at 150, 180, 250, 350, and 400° C. for 4 hours to obtain nano-gold catalysts. The calcined material-obtained was disposed in a quartz tube with an inside diameter of 6 mm with two ends thereof separately supported by fiberglass. Two thermocouples were inserted to measure the variations of temperature at the front and rear ends of the material. The gas used in the experiment was a $N_2$ gas mixture containing 1000 ppm of CO. The adsorption experiment was conducted with the gas mixture flowing at 250 ml/min for 300 minutes, followed by an oxidation activity test by using a CO-containing air. The CO adsorption results and the oxidation activity test results of the abovementioned nano-gold catalysts are shown in Table 2.

TABLE 2

| Example | Calcining temperature (° C.) | Adsorption of CO (ml/500 mg catalyst) | Maximum space velocity ($hr^{-1}$) at CO conversion >99% in the CO oxidation activity test |
|---|---|---|---|
| 13 | — | 0.21 | — |
| 14 | 150 | 20.65 | 180,000 |
| 15 | 180 | 31.10 | 600,000 |
| 16 | 250 | 26.92 | 570,000 |
| 17 | 350 | 9.52 | 330,000 |
| 18 | 400 | 2.34 | 90,000 |

$N_2$ gas mixture containing 1000 ppm CO, flow rate 250 ml/min, GHSV=30,000 $hr^{-1}$ Blank test: CO concentration at outlet reaches 1000 ppm at 1.8 minutes CO oxidation activity test: The flow rate of CO-containing air mixture having 2500 ppm of CO was adjusted until the CO conversion rate was less than 99%

Adsorption temperature and reaction temperature: room temperature (25° C.)

Temperature difference between the inlet and outlet during the adsorption test is less than 1° C.

The data in Table 2 indicate that the calcining temperature is preferably 150-350° C., and a nano-gold catalyst of the present invention prepared at this calcining temperature range not only has excellent CO adsorption performance at room temperature, but also has a high CO oxidation activity.

EXAMPLES 19~21

The procedures in Preparation Example 3 were repeated to obtain new nano-gold catalyst precursors, except that the gold content of 3 wt % was stoichiometrically changed to 2.25, 1.5, and 0.75 wt %, separately. 500 mg of the precursors were calcined at 180° C. for 4 hours to obtain nano-gold catalysts. The resulting calcined material was mounted in a quartz tube having an inside diameter of 6 mm with two ends thereof separately supported by fiberglass. Two thermocouples were inserted to measure the variations of temperature at the front and rear ends of the material. The gas used in the experiment was a $N_2$ gas mixture containing 1000 ppm of CO. The adsorption experiment was conducted with the gas mixture flowing at 250 ml/min for 60 minutes. The adsorption results of the abovementioned nano-gold catalysts to the CO-containing $N_2$ gas mixture are shown in Table 3.

TABLE 3

| Example | Gold content (wt %) | CO concentration at outlet (ppm) at adsorption time (min) of | | | | | | |
|---|---|---|---|---|---|---|---|---|
| | | 0 | 10 | 20 | 25 | 40 | 50 | 60 |
| 4 | 3.00 | 0 | 0 | 0 | 0 | 0 | 0 | 82 |
| 19 | 2.25 | 0 | 0 | 0 | 0 | 58 | 414 | 594 |
| 20 | 1.50 | 0 | 0 | 50 | 180 | — | — | — |
| 21 | 0.75 | 0 | 2 | 160 | 288 | — | — | — |

$N_2$ gas mixture containing 1000 ppm CO, flow rate 250 ml/min, GHSV=30,000 $hr^{-1}$ Blank test: CO concentration at outlet reaches 1000 ppm at 1.8 minutes Adsorption temperature: room temperature (25° C.)

Temperature difference between the inlet and outlet during the adsorption test is less than 1° C.

EXAMPLE 22

500 mg of the material prepared in Preparation Example 3 was calcined at 180° C. for 4 hours to obtain a nano-gold catalyst. The calcined material was disposed in a quartz tube having an inside diameter of 6 mm with two ends thereof separately supported by fiberglass. Two thermocouples were inserted to measure the variations of temperature at the front and rear ends of the material. The gas used in the experiment was a $N_2$ gas mixture containing 1000 ppm of CO. The adsorption experiment was conducted continuously with the gas mixture flowing at 250 ml/min, and a carbon dioxide detection tube was used to analyze the $CO_2$ content of the tail gas at the $5^{th}$~$7^{th}$ and $8^{th}$~$10^{th}$ minutes. The analysis results of carbon dioxide are shown in Table 4.

TABLE 4

| Example | $5^{th}$~$7^{th}$ minutes | $8^{th}$~$10^{th}$ minutes |
|---|---|---|
| 22 | $CO_2$ 1000 ppm | $CO_2$ 1000 ppm |

Adsorption temperature: room temperature (25° C.)
Temperature difference between the inlet and outlet during the adsorption test is less than 1° C.

The data in Table 4 indicate that all 1000 ppm of CO is converted into carbon dioxide at room temperature by the nano-gold catalyst of the present invention.

EXAMPLES 23~28

500 mg of the material prepared in Preparation Example 3 was calcined at 180° C. for 4 hours to obtain a nano-gold catalyst. The calcined material was disposed in a quartz tube having an inside diameter of 6 mm with two ends thereof separately supported by fiberglass. Two thermocouples were inserted to measure the variations of temperature at the front and rear ends of the material. The gas used in the experiment was a $N_2$ gas mixture containing 1000 ppm of CO. The gas mixture was further humidified to contain 3 wt % of moisture. A water-gas shift reaction of carbon monoxide was conducted with the gas mixture flowing at 250 ml/min. The results of the water-gas shift reaction are shown in Table 5.

TABLE 5

| Example | Reaction temp. (inlet), ° C. | Gas flow rate (ml/min) | Space velocity (1/hr) | CO conversion (%) |
|---|---|---|---|---|
| 23 | 140 | 250 | 30,000 | 74.00 |
| 24 | 145 | 250 | 30,000 | 77.46 |
| 25 | 150 | 250 | 30,000 | 77.60 |
| 26 | 165 | 250 | 30,000 | 79.83 |
| 27 | 172 | 250 | 30,000 | 81.42 |
| 28 | 180 | 250 | 30,000 | 79.04 |

The data in Table 5 indicate that a nano-gold catalyst of the present invention can be used to remove 74-81% of CO through the water-gas shift reaction.

EXAMPLE 29

6 ml of the material prepared in Preparation Example 3 was calcined at 180° C. for 4 hours to obtain a nano-gold catalyst. The calcined material was disposed in a quartz tube having an inside diameter of 25.4 mm with two ends thereof separately supported by fiberglass. Two thermocouples were inserted to measure the variations of temperature at the front and rear ends of the material. The gas mixture used in the experiment contained 0.89% of CO, 18.51% of $CO_2$, 47.87% of $H_2$, and the balance $N_2$. The adsorption experiment was conducted with the gas mixture flowing at a space velocity of 6000 $hr^{-1}$. The adsorption results are shown in Table 6.

TABLE 6

| Example | \multicolumn{6}{c}{CO concentration at outlet (%) at adsorption time (min) of} |
|---|---|---|---|---|---|---|

| Example | 0 | 5 | 10 | 15 | 20 | 25 |
|---|---|---|---|---|---|---|
| 29 | 0 | 0.01 | 0.07 | 0.18 | 0.29 | 0.38 |

Adsorption temperature: room temperature (25° C.)
Temperature difference between the inlet and outlet during the adsorption test is less than 1° C.

The data in Table 6 indicate that nano-gold catalyst of the present invention have rather good adsorption performance to a hydrogen-rich gas mixture at room temperature.

EXAMPLES 30~33

6 ml of the material prepared in Preparation Example 3 was calcined at 180° C. for 4 hours to obtain a nano-gold catalyst. The calcined material was disposed in a quartz tube having an inside diameter of 25.4 mm with two ends thereof separately supported by fiberglass. Two thermocouples were inserted to measure the variations of temperature at the front and rear ends of the material. A gas mixture containing 0.89% of CO, 18.51% of $CO_2$, 47.87% of $H_2$, 1.34% of $O_2$, and the balance $N_2$ was added with 20% of moisture, which was used in the selective oxidation and water-gas shift reaction experiment. The experiment was conducted with the gas mixture flowing at a space velocity of 6000 $hr^{-1}$. The results are shown in Table 7.

TABLE 7

| Example | Reaction temp. (inlet), ° C. | CO conc. (%) | $CO_2$ conc. (%) | $H_2$ conc. (%) | CO conversion (%) |
|---|---|---|---|---|---|
| 30 | 130 | 0.16 | 19.99 | 47.96 | 82.02 |
| 31 | 140 | 0.17 | 20.08 | 47.76 | 80.90 |
| 32 | 150 | 0.18 | 20.09 | 47.76 | 79.78 |
| 33 | 160 | 0.18 | 20.09 | 47.75 | 79.78 |

The data in Table 7 show that both the concentrations of hydrogen and $CO_2$ increase slightly, indicating the occurrence of the water-gas shift and selective oxidation reaction in the experiments.

The present invention has been described in the above, however, people skilled in the art still can make various variations and modifications without departing from the scope of the following claims.

The invention claimed is:

1. A method for removing carbon monoxide (CO) from a gas mixture containing CO, which comprises contacting a CO-containing gas mixture with a nano-gold catalyst in order to remove CO from said gas mixture, wherein said nano-gold catalyst includes a solid support and gold deposited on said support, wherein said gold has a size of less than 10 nm, and support comprises a mixed metal hydroxide and oxide having the following formula:

$$M(OH)_q O_y$$

wherein M is Ti, Fe, Co, Zr, or Ni; q is 0.1-1.5; and q+2y=z, wherein z is the valence of M.

2. The method as claimed in claim 1, wherein said support is composed of said mixed metal hydroxide and oxide, and has a specific surface area of larger than 150 m²/g, and said nano-gold catalyst contains 0.1 to 10 wt % of gold, based on the weight of said support.

3. The method as claimed in claim 1, wherein q is 0.5-1.5 and M is Ti, Fe (III) or Co.

4. The method as claimed in claim 3, wherein M is Fe (III).

5. The method as claimed in claim 1, wherein said gold has a size smaller than 5 nm.

6. The method as claimed in claim 1, wherein said contacting is carried out at room temperature.

7. The method as claimed in claim 1, wherein said gas mixture further contains oxygen, and said contacting is carried out at room temperature.

8. The method as claimed in claim 1, wherein said gas mixture is a hydrogen-rich gas mixture further containing steam and hydrogen, and said contacting is carried out at a temperature from room temperature to 300° C.

9. The method as claimed in claim 8, wherein said hydrogen-rich gas mixture is a hydrogen-rich reformate gas formed by reforming a hydrocarbon or methanol.

10. The method as claimed in claim 9, wherein said hydrogen-rich gas mixture contains 30-80 mole % of hydrogen, and has a mole ratio of H₂O to CO is 2-10.

11. The method as claimed in claim 1, wherein said gas mixture is a hydrogen-rich gas mixture further containing oxygen and hydrogen, and said contacting is carried out at 50-250° C.

12. The method as claimed in claim 11, wherein said hydrogen-rich gas mixture contains 30-80 mole % of hydrogen, and has a mole ratio of oxygen to CO is 0.5-2.

13. The method as claimed in claim 2, wherein said gas mixture is a hydrogen-rich gas mixture further containing oxygen and hydrogen, and said contacting is carried out at 50-250° C.

14. The method as claimed in claim 13, wherein M is Fe (III).

15. The method as claimed in claim 5, wherein said gas mixture is a hydrogen-rich gas mixture further containing oxygen and hydrogen, and said contacting is carried out at 50-250° C.

16. A method for removing carbon monoxide (CO) from a gas mixture containing CO, which comprises contacting a CO-containing gas mixture free of oxygen with a nano-gold catalyst to remove CO from said gas mixture, wherein said nano-gold catalyst includes a solid support and gold deposited on said support, wherein said gold has a size of less than 10 nm, and support comprises a mixed metal hydroxide and oxide having the following formula:

$$M(OH)_q O_y$$

wherein M is Ti, Fe, Co, Zr, or Ni; q is 0.1-1.5; and q+2y=z, wherein z is the valence of M.

17. The method as claimed in claim 16, wherein said support is composed of said mixed metal hydroxide and oxide, and has a specific surface area of larger than 150 m²/g, and said nano-gold catalyst contains 0.1 to 10 wt % of gold, based on the weight of said support.

18. The method as claimed in claim 16, wherein q is 0.5-1.5 and M is Ti, Fe (III) or Co.

19. The method as claimed in claim 17, wherein said gas mixture is a hydrogen-rich gas mixture further containing steam and hydrogen, and said contacting is carried out at a temperature from room temperature to 300° C.

20. The method as claimed in claim 19, wherein said hydrogen-rich gas mixture contains 30-80 mole % of hydrogen, and has a mole ratio of H₂O to CO is 2-10.

* * * * *

UNITED STATES PATENT AND TRADEMARK OFFICE
CERTIFICATE OF CORRECTION

PATENT NO. : 7,666,377 B2
APPLICATION NO. : 11/138480
DATED : February 23, 2010
INVENTOR(S) : Wu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1016 days.

Signed and Sealed this

Twenty-eighth Day of December, 2010

David J. Kappos
*Director of the United States Patent and Trademark Office*